Nov. 4, 1969 MASAO SUGI ET AL 3,475,893
METHOD OF MANUFACTURING COMMUNICATION CABLE AND
MANUFACTURING APPARATUS
Filed April 5, 1967 3 Sheets-Sheet 1

INVENTORS
MASAO SUGI &
BY HIROYUKI KUMAMARU
CAROTHERS & CAROTHERS
THEIR ATTORNEYS

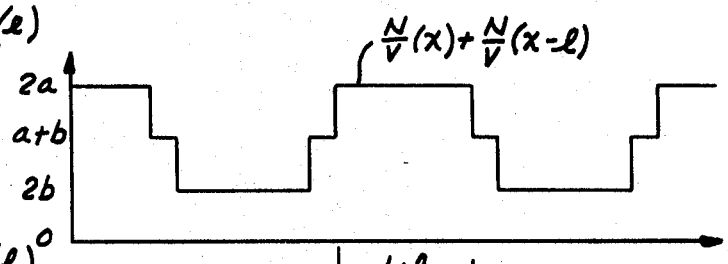
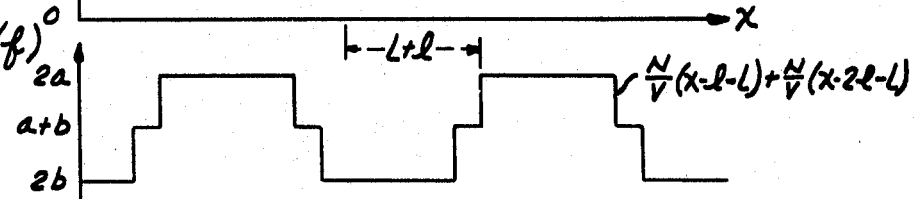
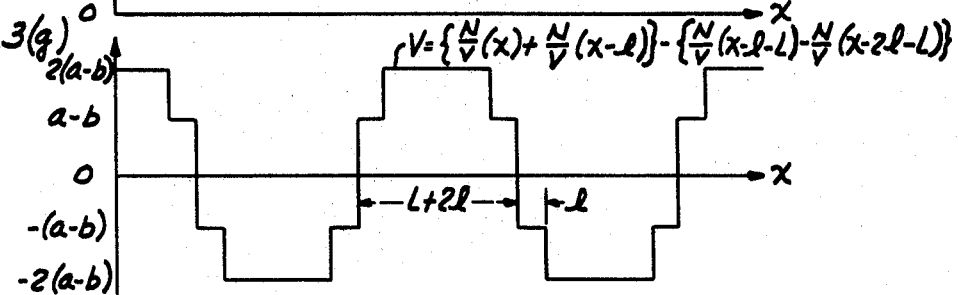
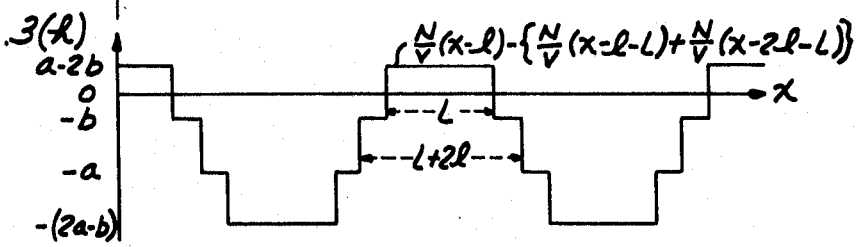

United States Patent Office 3,475,893
Patented Nov. 4, 1969

3,475,893
METHOD OF MANUFACTURING COMMUNICATION CABLE AND MANUFACTURING APPARATUS
Masao Sugi and Hiroyuki Kumamaru, Kamakura-shi, Japan, assignors to Sumitomo Electric Industries, Ltd., Osaka, Japan, a company of Japan
Filed Apr. 5, 1967, Ser. No. 628,713
Claims priority, application Japan, Apr. 8, 1966, 41/22,374
Int. Cl. D01h 1/10, 7/86, 7/02
U.S. Cl. 57—58.84                          17 Claims

ABSTRACT OF THE DISCLOSURE

A method and apparatus for the manufacture of communication cable having alternating twists imparted to the group of elementary wires making up the cable wherein a pair of fliers envelop and revolve about a device having spaced rows of free wheeling rollers for accumulating the group of elementary wires. The ratio of the speed of revolution of the fliers to the line speed of the group of elementary wires passing through the accumulator as a function of line length is varied to two settings for a fixed length of stranded wire.

---

The present invention relates to a novel method and apparatus for stranding in alternating S and Z twists, pairs, quads or groups of stranded wires for communication cable. With regard to conventional methods of stranding groups of elementary wires or groups of stranded wires with alternating S and Z twists, a method and apparatus has already been proposed in which an accumulating device containing a group of free rollers, around which a fixed length of such group of elementary wires or of stranded wires is wound and stretched, is revolved. The direction of revolution of this accumulating device is reversed alternately for a fixed length of stranding (equal to the accumulation length of said group of elementary wires or group of stranded wires in the accumulating device). Also, accumulating device may revolve only in one fixed direction, but the line speed of the group of elementary wires or group of stranded wires passing through the accumulating device is changed in two steps for each of said accumulation lengths. However, such heretofore known methods and apparatus have a shortcoming in that, since the accumulating device has a great moment of inertia and itself is revolved, the bearing resistance of the group of free rollers increases due to its centrifugal force, so that the pulling tension of the group of elementary wires or group of stranded wires from the accumulating device increases. This makes it impossible to increase the line speed to a significant degree for the stranding in alternating S and Z twists.

On the other hand, a twice stranding machine using a flier is known as an apparatus for high speed stranding This machine makes it possible to obtain a high line speed of stranding by revolving the flier at high speeds and by means of a twice stranding mechanism. However, all the machines of this type known to the public, are for one direction stranding. As no alternating twist stranding is known in combination with a flier, a wire feeding device or take-up device for stranded wire is built within the interior of the revolving body of the flier, so that such fliers are not quite satisfactory with respect to operational efficiency for use in alternate stranding. In the case of the present invention, the strong points of the alternating twist apparatus using an accumulating device and of the twice stranding machine of the flier type, are combined to provide a new method and apparatus for high speed stranding in alternating S and Z twists for the manufacture of communication cable.

Other objects and advantages appear hereinafter in the following description and claims.

The accompanying drawings show, for the purpose of exemplification without limiting the invention or the claims thereto, certain practical embodiments illustrating the principles of this invention wherein:

FIGS. 3e through 3h are other graphical plots illustrating the operation of the method and apparatus of the present invention wherein the line length selected for each alternate twist is varied from that employed in connection with FIGS. 2a through 2d.

Figure 1:
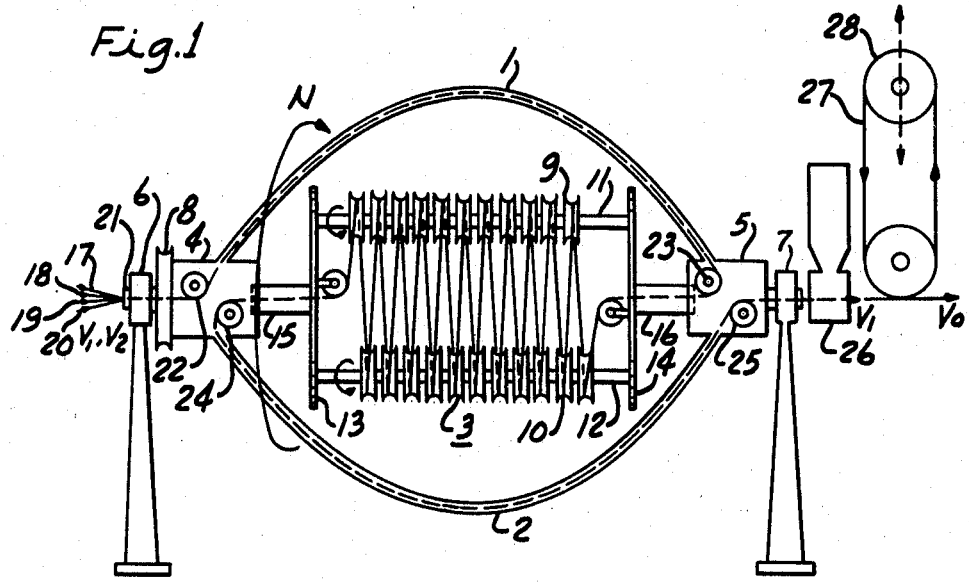
FIG. 1 is a diagrammatic sketch in elevation of one embodiment of the stranding apparatus of the present invention.

FIGURE 1 shows one embodiment of the twice twisting type accumulation device used in the apparatus of the present invention. This device comprises two revolving fliers 1 and 2, which are revolved and driven from outside, and an accumulating device 3 which is spatially stationary even while the fliers are revolving. The ends of the fliers 1 and 2 are attached and fixed to the end parts 4 and 5 respectively, which are supported by bearings 6 and 7 respectively. The end part 4 has a pulley 8 fixed to it, and components 8, 1, 2, 4 and 5 revolve as one body when external power is transmitted to pulley 8 by means of a gear transmission, belt drive, or the like. On the other hand, the accumulating device 3 has built in it one or more rows of free rollers (two rows in the case of FIGURE 1) rollers 9 and 10 which can freely revolve around an axis. They have the effect that the group of elementary wires or group of stranded wires wound on and stretched between the free roller rows 9 and 10 is accumulated for its length. The shafts on which the free roller rows 9 and 10 are mounted respectively are supported by end plates 13 and 14. At the ends of the end plates 13 and 14 are fixed hollow shafts 15 and 16 respectively which are journaled with said end parts 4 and 5 via bearings respectively. Because of the above arrangement, even while the fliers 1 and 2 and end parts 4 and 5 are revolving, the accumulating part 3 located between the hollow shafts 15 and 16 does not revolve but remains spatially stationary, with the center of gravity kept lower; for example, with the free roller row 10 kept lower. Needless to say, it is possible to revolve the accumulating device 3 manually around the central axis of the hollow shafts 15 and 16 in case it is found necessary to place a group of elementary wires or group of stranded wires around them while the fliers 1 and 2 are stationary. In a special case, it is also possible to install a gear mechanism between the end parts 4 and 5 and hollow shafts 15 and 16 on both sides or on one side only so that the accumulating part 3 may not be formed to revolve even if the fliers 1 and 2 revalve. The apparatus of the present invention is capable of stranding and assembling in alternating S and Z twists, a group of a plurality of elementary wires or a group of stranded wires. In FIGURE 1, however, the quad stranding of communication cable is explained as a representative example. Four lines of insulated elementary wires 17–20 are supplied to the assembling die 21 from the lefthand of the figure, and are put together into one group of elementary wires. After passing through the holes made in the central axis of 6 and 8, they pass through the interior of the first flier 1 via the guide rollers 22 provided in the end part 4. Then, they are introduced into the accumulating device 3 after passing the guide roller 23 provided in the end part 5, and are put around the rows 9 and 10 of free rollers, as shown in FIGURE 1. The group of elementary wires which has come out of the accumulating device 3 passes around the guide roller 24 provided in the end part 4 and is pulled out to the right of the drawing after passing through the second flier 2 and around the guide roller 25 provided in the end part 5. To the right of the bearing 7 an adhesive applying device 26 is mounted for the purpose of preventing untwisting of the stranded group of elementary wires. When the stranded group is not a group of elementary wires but is rather a group of stranded wires, the device 26 is a head for rough binding the stranded group with plastic tape or yarn instead of the adhesive applying device. As to the position of device 26, it may also be placed at the inlet of the group of elementary wires, namely at the left of the bearing 6. In the instance of the two step line speed SZ alternating twisting of the present invention, the group of elementary wires that has come out of the adhesive applying device 26 enters the compulsory dancer rollers 27 to be given line speeds $V_1$ and $V_2$ alternately of given high and low steps, as mentioned later, and is pulled out to the right of the drawing at a constant line speed $V_0$.

Figure 2A:
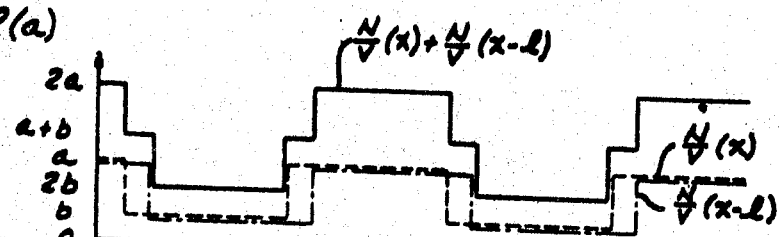
FIGS. 2a through 2d are graphical plots illustrating the operation of the method and structure of the present invention in terms of line twists per unit length.

Now we will explain the action of the apparatus of the present invention. For the purpose of explanation, let N represent the instant speed of revolution of the fliers 1 and 2, and V the instant line speed of the group of elementary wires passing through the accumulating device 3. The portion of the group of elementary wires that passes the guide roller 25 at the outlet of the apparatus at a point of time is selected as the time origin for the length of the quad-stranded wire to be studied, and the length of the group of elementary wires that has been quad-stranded after some length of time from said point of time origin is represented by X. Now, we consider an example where the ratio of N and V, i.e.

$$\frac{N}{V}(X)$$

is varied alternately to two constant steps or settings high and low, for a fixed length of the stranded wire with respect to X as shown in FIGURE 2a. As means to vary $$\frac{N}{V}(X)$$

there are three kinds of means in the prior art—a means which, keeping V time-wise constant, switches N alternately to high and low speeds in two steps or positive and negative in two steps (in this latter example, the fliers 1 and 2 repeat reversing motion), a means which switches V to high and low speeds in two steps while keeping N constant, and a means which varies both N and V synchronously to switch $$\frac{N}{V}(X)$$

as a whole to high and low or positive and negative in two steps. FIGURE 1 refers to a case where N is constant while V is switched to high and low settings. The line speed $V_0$ for pulling out the wire is timewise constant and the moving roller 28 of the compulsory roller system 27 is forcibly oscillated up and down as shown in the drawing, when the line speed of the group of elementary wires before entering 27 is varied to high and low steps $V_1$ and $V_2$ which are already known. When $$\frac{N}{V}(X)$$

is varied in the form of a rectangular or square wave with respect to X as shown in FIGURE 2a, a stranded wire of good alternating S and Z twists is obtained at the outlet of the apparatus of the present invention if the half-period or half-cycle of the rectangular wave, namely the width of one concavity or one convexity, is chosen to be as mentioned in one of the instances hereinafter set forth. Here the length of the group of elementary wires existing in the flier 1 or 2 of FIGURE 1 is represented by $l$; in other words, the length of elementary wires between guide rollers 22 and 23 along the flier 1 and the length of elementary wires between guide rollers 24 and 25 along the flier 2 are each represented by $l$. The accumulated length of elementary wires between guide rollers 23 and 24 via the accumulating device 3, namely the accumulated length, is representd by L.

First instance: When the half-period of the change of $$\frac{N}{V}(X)$$

is chosen to be equal to L.

FIGURE 2 explains this example. In the apparatus of the present invention, the group of elementary wires is given, immediately before entering the guide roller 22, a twist of $$-\frac{N}{V}(X-2l-L)$$

per unit length of the group of elementary wires (FIGURE 2b), and, at the outlet of the guide roller 23, a twist of $$-\frac{N}{V}(X-l-L)$$

(FIGURE 2b), a twist of $$+\frac{N}{V}(X-l)$$

at the entrance of the guide rollers 24 (FIGURE 2a), and finally a twist of $$+\frac{N}{V}(X)$$

per unit length of the group of elementary wires (FIGURE 2a) when the group of elementary wires leaves the guide roller 25 to the right. Therefore, the number of twists per unit length $v(X)$ (reciprocal of the twisting pitch) obtained by the apparatus of the present invention will be given by the undermentioned formula as the composite of the above-mentioned twists made four times.

$$v(X) = \left\{\frac{N}{V}(X) + \frac{N}{V}(X-l)\right\} - \left\{\frac{N}{V}(X-l-L) + \frac{N}{V}(X-2l-L)\right\}$$

Figure 2B:
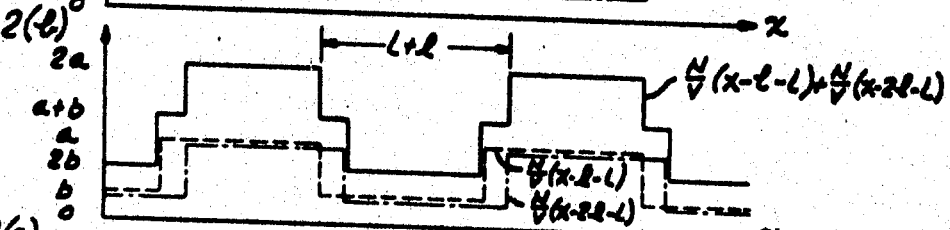

The wave form shown in solid lines in FIGURE 2a represents the change with respect to X of the line length X of the group in the first set of brackets of the above equation. Its physical meaning is the sum of the twists per unit length of the group of elementary wires twisted twice in the positive direction at the inlet of the outlet side flier 2 of FIGURE 1 and at the outlet. The wave form in solid lines in FIGURE 2b represents the change with respect to X of the group in the second set of brackets on the right side of the above formula. Its physical meaning is the sum of the twists per unit length of the group of elementary wires twisted twice in the negative direction at the inlet and outlet of the inlet side flier 1 of FIGURE 1. That is to say, the changes of twists given to the group of elementary wires passing through the accumulating device 3 due to the lapse of time is represented.

Figure 4:
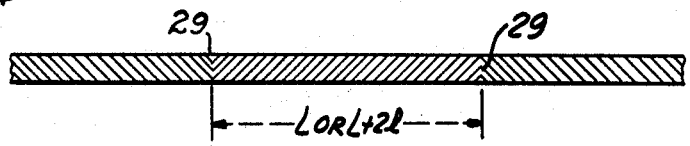
FIG. 4 is a view in side elevation of a communication cable consisting of a group of elementary wires having imparted thereto an alternate twist in accordance with the practice of the present invention.
Figure 2C:
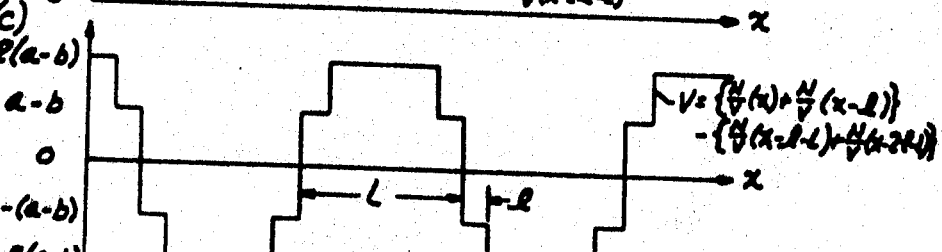

FIGURE 2c shows the change along the line length of the number of twists per unit length (reciprocal of the twisting pitch) eventually given to the quad stranded wire leaving the apparatus of the present invention. From this it can be seen that positive and negative directions of twist appear alternately with the length L as one cycle for reversal of the twisting direction, producing ultimately such alternating S and Z twists as shown in FIGURE 4.

Figure 2D:
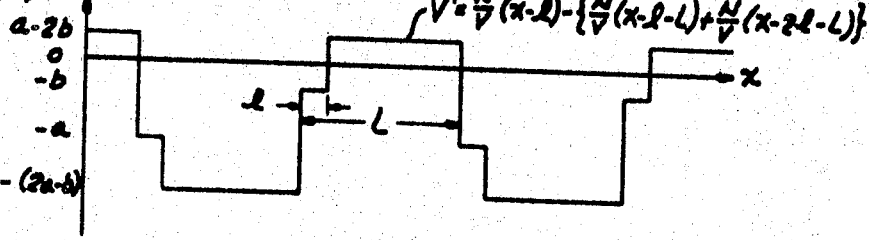

FIGURE 2d shows changes in twist per unit length of the group of elementary wires in the flier 2 on the outlet side of FIGURE 1 due to lapse of time.

Second instance: when the half-period of the change of $$\frac{N}{V}(X)$$

is chosen to be equal to (2l+L).

In this example, the changes by time of twists in unit length of the group of elementary wires outside and inside the apparatus of the present invention are shown in FIGURES 3e, f, g and h corresponding to FIGURE 2a, b, c and d respectively. FIGURE 3g shows the change along the length of the stranded wire of the number of twists per unit length (the reciprocal of the pitch of lay) eventually given to the quad stranded wire leaving the apparatus of the present invention. Positive and negative twists having a cycle of twist direction reversal of (2l+L), namely a stranded wire with alternating S and Z twists as shown in FIGURE 4, are obtained.

If a half-period of the change of $$\frac{N}{V}(X)$$

other than those in these two cases is selected, a point where $v(X)=0$, having no substantial twist, takes place at the point of twist direction reversal in FIGURE 2c or FIGURE 3g. Furthermore, the neighborhood or area of the twist direction reversal point (FIGURE 4, point 29) of the stranded wire with alternating S and Z twists obtained by the apparatus of the present invention or others shows a tendency of untwisting taking place in that part, so that the stranded wire may have parts where the elementary wires are not twisted but remain straight to the detriment of the crosstalk characteristic of the communication cable. In order to prevent untwisting, therefore, in the case of quad stranding shown in FIGURE 1, an adhesive is applied and solidified on the stranded wire about the twist direction reversal point, FIGURE 4 as indicated at 29, by means of the adhesive applying device, FIGURE 1 at 26.

It is also possible that instead of the use of the adhesive applying device 26, rough binding with a tape or yarn may be done for the whole length of the stranded wire to prevent the untwisting in the neighborhood of the twist direction reversal point. In double twisting machines, a phenomenon that the pitch lay of the stranded wire shows irregular small variations in the longitudinal direction is apt to take place. In order to remedy this phenomenon, it is also possible to provide the pitch correcting reversing plate of the prior art before the application of an adhesive to the stranded wire, namely between 7 and 26 of FIGURE 1, and thereby correct the pitch lay in the longitudinal direction by means of the method and mechanism of the prior art.

In the embodiment shown in FIGURE 1, the revolving fliers 1 and 2 are in the form of bow-shaped pipes. However, it does not depart from the spirit of the present invention to make some change in the construction of the fliers; for example, to use the construction well known with respect to the ordinary double stranding machine in which a cylindrical revolving cage which envelops the accumulating device 3 within it and which revolves integrally with the end plates 4 and 5 is provided with guide rollers for having the group of elementary wire stretched around them to act with the same effect as the fliers 1 and 2. In the embodiment shown in FIGURE 1, the construction of the accumulating device is such that the group of elementary wires is laid in the vertical direction. It does not depart from the spirit of the present invention to change this construction so as to have the group of elementary wires placed in left-and-right or horizontal direction.

If the apparatus of the present invention is used, the stranding speed of the conventional SZ twisting machine may be doubled by combining a double twisting mechanism such as a flier of a small inertia efficiency with a spatially stationary accumulating device, and in addition it is possible to keep the tension of the stranded wire being taken up at a low level. Because of such advantages, it has a great industrial value.

We claim:
1. The method of manufacturing lay-reversed communication cable by imparting alternate-reverse twists to a selected length of a wire group comprising the steps of:
   revolving a flier device having an unobstructed central interior axially about a stationary accumulator mounted within said interior,
   externally feeding the wire group axially in one direction into one end of the flier device and axially in the reverse direction out of the opposite end of the flier device into said interior,
   accumulating a predetermined length of the wire group exiting into said interior on the stationary accumulator,
   feeding the accumulated wire group axially from said interior in said reverse direction into said one end of the flier device and axially in said one direction out of said opposite end, and
   alternately varying the ratio of the speed of revolution of the flier device to the line speed of the wire group passing through the accumulator as a function of the wire group line length to two preselected settings to impart alternate-reverse twists to the wire group.

2. The method of claim 1 characterized in that the lengths of the wire group separated by the accumulated length and retained at any given instant within the flier device are equal.

3. The method of claim 2 characterized in that said predetermined accumulated length is longer than a total of the wire group length retained at any one instant within the flier device alone.

4. The method of claim 3 characterized in that the two settings are alternately varied at each successive of a preselected line length wherein this preselected line length is chosen from a selection consisting of the predetermined accumulated length and the predetermined accumulated length plus the total wire group line length retained in the flier device at any given instant.

5. The method of claim 4 wherein the flier device is revolved at a constant speed in one direction and the line speed is alternately varied at each successive preselected line length to two constant settings.

6. The method of claim 4 wherein the revolutionary speed of the flier device is varied at each successive preselected line length of the wire group to two constant settings and the line speed is maintained constant.

7. The method of claim 6 wherein said constant settings are positive and negative respectively.

8. The method of claim 6 wherein said constant settings are both positive.

9. The method of claim 4 wherein the revolutionary speed of the flier device and the line speed are varied synchronously.

10. The method of claim 2 characterized by the step of adhering the reversal points of the alternate-reverse twists of the wire group to prevent unraveling of the alternate twists.

11. In the manufacture of lay-reversed communication cables, an apparatus for imparting alternate-reverse twists to a selected length of a wire group comprising:
   a stationary accumulator having an axial inlet and outlet at opposite ends for accumulating a predetermined length of said wire group;
   flier means having an unobstructed central interior receiving said accumulator and mounted for axial revolutions thereabout;
   said flier means having an external and internal axial inlet and outlet at opposite ends to permit said wire group to be externally fed axially into one end and through said flier means for a specified length in one direction, axially back from the opposite end in the reverse direction into said accumulator, from said accumulator axially in said reverse direction into said one end, and in said one direction through said flier means for said specified length and axially out of said other end;

draw means to draw said wire group from said last mentioned outlet; and drive means for alternately varying the ratio of the speed of revolution of the flier device to the line speed of the wire group passing through said acculator as a function of the wire group line length to two preselected settings to impart alternate-reverse twists to the wire group.

12. The apparatus of claim 11 characterized in that said flier means consists of a pair of opposed coextending outwardly bowed tubes of equal length having their adjacent ends secured respectively to the wall of two end sleeve members having axially aligned passages therethrough, said open tube ends being exposed to the passage interior of their respective sleeve members, and a guide roller secured adjacent each exposed tube end and positioned to receive and redirect said wire group to and from said flier tubes as required.

13. The apparatus of claim 11 characterized in that said settings are alternately varied at each successive of a preselected line length, said preselected line length being chosen from a selection consisting of said accumulated predetermined line length and said accumulated predetermined line length plus twice said specified length retained in said flier means.

14. The apparatus of claim 13 characterized in the said drive means consists of compulsory dancer rollers to change the draw-out speed of said wire group alternately in two steps and a rotary drive to revolve said flier means in one direction at a constant speed.

15. The apparatus of claim 13 characterized by gear means between said revolving flier means and said accumulator to maintain said accumulator spatially stationary with respect to said revolving fliers.

16. The apparatus of claim 13 characterized in that said wire group is drawn by said draw means at a constant velocity, said flier means having its direction of revolution about said accumulator periodically reversed.

17. The apparatus of claim 11 characterized by adhesive application means to receive said wire group and permit securing of said alternate-reverse twists relative to each other.

References Cited

UNITED STATES PATENTS

| | | | |
|---|---|---|---|
| 3,169,360 | 2/1965 | Corrall et al. | 57—77.3 XR |
| 3,365,871 | 1/1968 | Schatz et al. | 57—59 |
| 3,373,549 | 3/1968 | Shaw | 57—64 XR |
| 3,373,550 | 3/1968 | Symonds | 57—64 XR |
| 3,385,046 | 5/1968 | Schatz | 57—62 XR |

FOREIGN PATENTS 1,038,296  9/1953  France.

DONALD E. WATKINS, Primary Examiner

U.S. Cl. X.R.

57—62, 156